United States Patent [19]

Kurabayashi et al.

[11] Patent Number: 5,072,335
[45] Date of Patent: Dec. 10, 1991

[54] ELECTRICAL DOUBLE-LAYER CAPACITOR

[75] Inventors: Ken Kurabayashi, Chigasaki; Yoshinobu Tsuchiya, Fujisawa; Akio Yoshida, Kamakura; Hitoshi Koizumi, Hiratsuka; Yoriaki Niida, Yamato, all of Japan

[73] Assignee: Isuzu Motors Limited, Tokyo, Japan

[21] Appl. No.: 559,075

[22] Filed: Jul. 30, 1990

[30] Foreign Application Priority Data

Aug. 23, 1989 [JP] Japan .................................. 1-216967

[51] Int. Cl.$^5$ .............................................. H01G 9/00
[52] U.S. Cl. ..................................... 361/502; 29/25.03
[58] Field of Search ....................... 361/502; 29/25.03

[56] References Cited

U.S. PATENT DOCUMENTS 4,697,224 9/1987 Watanabe et al. .................. 361/502

FOREIGN PATENT DOCUMENTS 56-070623 6/1981 Japan .
56-080120 7/1981 Japan .

OTHER PUBLICATIONS

Patent Abstracts of Japan, vol. 13, No. 386 (E-812) (3734), Aug. 1989.
Patent Abstracts of Japan, vol. 12, No. 186 (C-500) (3033), May 1988.

Primary Examiner—Donald A. Griffin
Attorney, Agent, or Firm—Spencer & Frank

[57] ABSTRACT

In producing an electrical double-layer capacitor cell, when the polarizing electrode (61,71) is formed by sintering to the collecting electrode (11,21) obtained by sintering a conductive powder into plate-like form, the contact resistance between the collecting electrode (11,21) and the polarizing electrode (61,71) becomes extremely small. Thereby, the internal resistance of the electrical double-layer capacitor cell becomes small.

5 Claims, 1 Drawing Sheet

ELECTRICAL DOUBLE-LAYER CAPACITOR

TECHNICAL FIELD

The present invention relates to an electrical double-layer capacitor having small internal resistance.

BACKGROUND ART

In FIG. 4 there is shown a conventional electrical double-layer capacitor cell. In FIG. 4, numerals 1 and 2 denote collecting electrodes, 3 and 4 gaskets, 5 a separator, and 6 and 7 paste-like polarizing electrodes.

The collecting electrodes 1 and 2 are formed of conductive rubber sheets, and the gaskets 3 and 4 are formed of insulating rubber. The paste-like polarizing electrodes 6 and 7 are made of paste-like active carbon powder formed by immersing dilute sulfuric acid into the active carbon powder. For the separator 5 a porous plastic film which passes ions, but which does not pass the active carbon particles, is used.

In order to make good contact between the respective active carbon particles, and to make good contact between the collecting electrode 1 and the paste-like polarizing electrode 6 and between the collecting electrode 2 and the paste-like polarizing electrode 7, pressure (1 to 100 $kg/cm^2$) is applied on the collecting electrodes 1 and 2. In order not to be destroyed by this pressure, the materials for the collecting electrodes 1 and 2 and for the gaskets 3 and 4 should be such which have elasticity.

In order to make the capacity of such an electrical double-layer capacitor cell large, it is necessary to increase the specific surface area (usually, 1000 to 2000 $m^2/g$) of the active carbon forming the polarizing electorde, and to make the bulk density in the capacitor case when it has been filled large.

On the other hand, since the polarizing electrode is difficult to handle in a state when it is in a paste-like form, there has been proposed a method in which the polarizing electrode is sintered to a solid plate-like form (for example, the official publication of the Japanese Patent Application Laid-Open No. 292612/1987). When the polarizing electrode is formed in a solid plate-like state, there is also the advantage that the bulk density is enhanced and the capacity is increased, and additionally, the contact of the active carbon particles to each other becomes denser to decrease the contact resistance.

Problem

However, the above-described conventional electrical double-layer capacitor cell has a part where large contact resistance between the particles of the active carbon to each other is present, and there has been a problem that the internal resistance as a whole can not be decreased.

Explanation of the Problem (1) In an electrical double-layer capacitor cell wherein a paste-like polarizing electrode has been used as a polarizing electrode, the contact resistance between active carbon particles to each other is large. Although pressurizing is carried out in order to diminish this, the pressurizing force is generated by the caulkin of the wrapping case.

However, in the case when the electrical double-layer capacitor cell has been made as a large type one, the pressurizing force required became greater since the area to be pressed becomes large, but due to the restriction from the raw material side of the wrapping case, etc., there were limits in the size of the pressurizing force capable of being generated. Therefore, it was impossible to apply the necessary pressure, and there was a limit for diminishing the contact resistance.

(2) In an electrical double-layer capacitor cell using a solid plate-like polarizing electrode as a polarizing electrode, the contact of the active carbon particles to each other becomes good, and the contact resistance between particles to each other becomes diminished, but since the contact between the solid plate-like polarizing electrode and the collecting electrode is not uniform, the contact resistance between both electrode members inevitably become increased.

In order to make the contact between the solid plate-like polarizing electrode and the collecting electrode good, a method can be considered in which pressure is applied to the collecting electrode, and the solid plate-like polarizing electrode is forcedly pushed.

However, in performing in such a manner as described above, there is the danger of destroying the solid plate-like polarizing electrode by the force applied, and therefore, this method can not be adopted.

SUMMARY OF THE INVENTION

The object of the present invention is to diminish the internal resistance of an electrical double-layer capacitor cell by decreasing the contact resistance between the collecting electrode and the polarizing electrode in an electrical double-layer capacitor cell.

Another object of the present invention is to make the handling of parts in the case of the production procedure, etc. easy, by sparing the paste-like parts in the construction parts of an electrical double-layer capacitor cell.

In order to attain the above-described objects, an electrical double-layer capacitor cell in which the collecting electrode and the polarizing electrode are formed by total sintering into a single unit is provided.

These and other objects of the invention will become more apparent in the detailed description and examples which follow.

DETAILED DESCRIPTION OF THE PREFERRED EMBODIMENTS

In the following, embodiments of the present invention will be explained in detail by referring to drawings.

Figure 1:
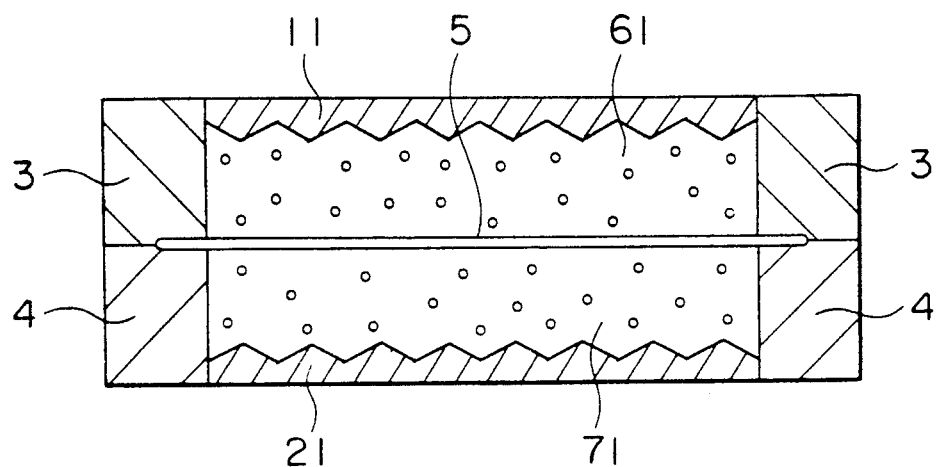
FIG. 1 is a schematic diagram showing an electrical double-layer capacitor cell according to one embodiment of the present invention.
Figure 2:
FIG. 2 is a schematic diagram showing a collecting electrode formed by sintering; according to the invention
Figure 3:
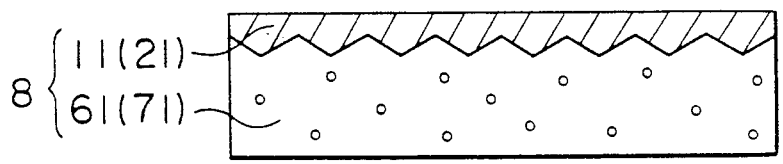
FIG. 3 is a schematic diagram showing a sintered body formed by combined sintering of the collecting electrode and the polarizing electrode; according to the invention

FIG. 1 shows the electrical double-layer capacitor cell according to the embodiment of the present invention, FIG. 2 shows a collecting electrode formed by sintering, and FIG. 3 shows a sintered body combinedly sintered with the collecting electrode and the polarizing electrode totally.

Figure 4:
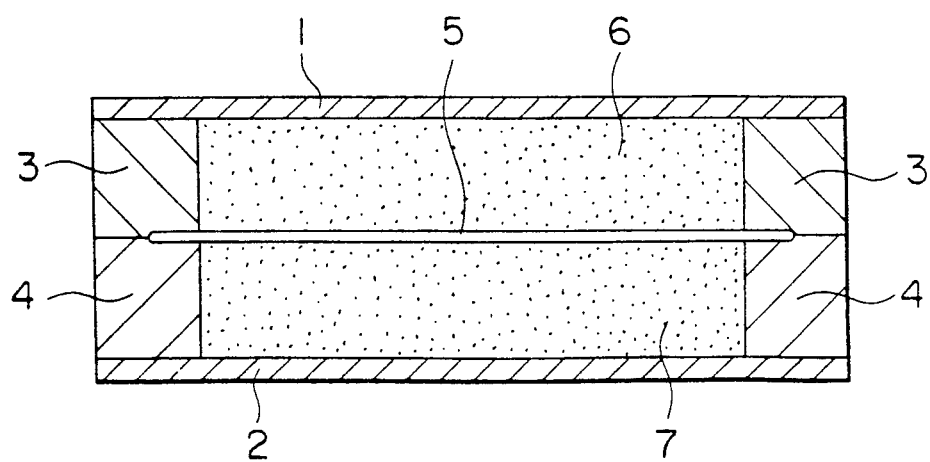
FIG. 4 is a diagram for showing the conventional electrical double-layer capacitor cell.

In these figures, reference numerals corresponding to those of FIG. 4 are used for like parts. Reference numerals 11 and 21 denote collecting electrodes, 61 and 71 denote solid-like polarizing electrodes, and 8 denotes a combined sintered body.

In the present invention, the collecting electrode and the polarizing electrode are made as a total unitary structure, so that the contact resistance between the two electrodes is diminished.

At first, as shown in FIG. 2, conductive particles such as active carbon particles, carbon black particles, etc., are pressed and sintered to a high density, and a plate-like collecting electrode 11 (21) is formed.

Next, on one surface of this plate-like collecting electrode 11 (21), is formed and totally adhered to the collecting electrodes polarizing electrode 61 (71) is formed and totally adhered to the collecting electrode by the sintering of active carbon particles, and a combined sintered body 8 is constructed as shown in FIG. 3. As the concrete method for sintering in this case, the method can be cited in which, for example, active carbon is deposited on the collecting electrode 11 (21) and pressed, and the particle surface is molten and sintered in this state by a method such as plasma melting, etc. By performing in such a manner, active carbon is sintered while preserving its porosity. Then, the solid-like polarising electrode 61 (71) is impregnated with an electrolytic liquid such as dilute sulfuric acid, etc.

In order to provide good adhesion of the solid-like polarizing electrode 61 (71) to the collecting electrode 11 (21), unevenness may be provided on the adhering surface of the collecting electrode 11 (21) in dependence to needs. In FIG. 1 to 3, there is shown the case wherein unevenness is provided.

An electrical double-layer capacitor cell is constituted, in that two combined sintered bodies 8 formed in a manner as has been described above are arranged so that they are separated by a separator 5, and the circumference thereof is insulated and preserved with gaskets 3 and 4 as shown in FIG. 1.

In such an electrical double-layer capacitor cell as described above, since the collecting electrode 11 or 12 and the solid-like polarizing electrode 61 or 71 integrally formed, as a single unit or body 8 the resistance of the contact part between both electrode members becomes extremely small. Since two members are simultaneously totally solidified, the handling in the time of production procedures, etc. becomes advantageous (handling properties are excellent). Also, since a solid-like polarizing electrode is adopted as the polarizing electrode, the contact resistance between the active carbon particles to each other in the polarizing electrode is small.

Although the invention has been described in its preferred form with a certain degree of particularity, it is understood that the present disclosure of the preferred form has been changed in the details of construction and the combination and arranged of parts may be resorted to without departing from the spirit and the scope of the invention as hereinafter claimed.

We claim:

1. An electrical double-layer capacitor characterised by a collecting electrode and a polarizing electrode totally formed by sintering into a unitary body.

2. An electrical double-layer capacitor as claimed in claim 1, characterised by an unevenness provided in the boundary surface between the collecting electrode and the polarizing electrode.

3. In an electrical double-layer capacitor cell including a separator, first and second polarizing electrodes disposed opposite each other on respectively opposite sides of said separator, and first and second collecting electrodes contacting said first and second polarizing electrodes respectively, with each said polarizing electrode being disposed between said separator and the associated one of said collecting electrodes; the improvement wherein said first collecting electrode and said first polarizing electrode and said second collecting electrode and said second polarizing electrode are respective sintered unitary solid bodies.

4. An electrical double-layer capacitor cell as defined in claim 3, wherein the boundary surface between the collecting electrode and the polarizing electrode of each of said unitary bodies is uneven.

5. An electrical double-layer capacitor cell as defined in claim 3, further comprising insulating gasket means sealingly surrounding the edge surface of each of said unitary bodies.

* * * * *